United States Patent
Tomita

[11] Patent Number: 5,508,843
[45] Date of Patent: Apr. 16, 1996

[54] SIGHT SCOPE

[75] Inventor: Saburo Tomita, Tokyo, Japan

[73] Assignee: Asia Optical Co., Ltd., Tokyo, Japan

[21] Appl. No.: 231,680

[22] Filed: Apr. 25, 1994

[30] Foreign Application Priority Data

Sep. 14, 1993 [JP] Japan .................................. 5-252343

[51] Int. Cl.⁶ ...................... G02B 23/00; G02B 26/02; G02B 23/10; F41G 1/32
[52] U.S. Cl. .................... 359/428; 359/236; 359/399; 356/252; 33/241
[58] Field of Search ........................ 359/418, 428, 359/399, 227, 232–236, 424, 427–429, 738–739; 356/151–153, 251–254; 33/241–252, 165; 42/100–103; 362/110, 113; 351/214–218, 233–235, 243

[56] References Cited

U.S. PATENT DOCUMENTS

| | | | |
|---|---|---|---|
| 3,672,782 | 6/1972 | Akin | 356/251 |
| 3,994,597 | 11/1976 | Calder et al. | 356/251 |
| 4,417,814 | 11/1983 | Doliber | 356/252 |
| 4,665,622 | 5/1987 | Idan | 356/252 |
| 4,859,058 | 8/1989 | Ekstrand | 356/251 |

FOREIGN PATENT DOCUMENTS 63-74994  5/1988  Japan .

Primary Examiner—Thong Q. Nguyen
Attorney, Agent, or Firm—Evenson McKeown Edwards & Lenahan

[57] ABSTRACT

In a sight scope device, a sleeve-like body is provided with a translucent mirror and a light source. Light emitted from the light source is reflected by the translucent mirror and proceeded toward an eyepiece side so as to served as an aiming point. A shield member interposed between the translucent mirror and the light source and having a plurality of through-holes is provided on the body. These through-holes have different areas, respectively, with each other. A movement of the shield member on a plane which is generally perpendicular to an axis of the body causes one of the through-holes to be selectively arranged or appeared on a line connecting the light source and the translucent mirror. The one of the through-holes is selected depending on a distance to a target.

3 Claims, 8 Drawing Sheets

SIGHT SCOPE

BACKGROUND OF THE INVENTION

This invention relates to a sight scope used for a rifle gun and the like.

A sight scope disclosed in Japanese Laid-Open Utility Model Application No. Sho 63-74994 comprises a sleeve-like body. This body includes an outer sleeve and an inner sleeve received in the outer sleeve in such a manner as to be able to incline relative to an axis of the outer sleeve. A translucent mirror is secured to that end portion of the inner sleeve which is located on an objective side. Secured to that end portion of the inner sleeve which is located on an eyepiece side are a light source and a shield member having a through-hole. Light from the light source is passed through the through-hole formed in the shield member, and proceeded toward the translucent mirror by which the light is reflected toward the eyepiece side, and finally provided or served as an aiming point for a gun shooter. Therefore, in the sight scope of the type just mentioned, the size of the aiming point is determined based on the size of an area of the through-hole formed in the shield member.

When a target of a certain size is viewed by an eye through the sight scope, if the distance to the target is short, the target looks large, but if the distance to the target is long, the target looks small. In the above-mentioned sight scope, since the size of the aiming point is constant, the aiming point looks too large for a distant target and too small for a near target.

SUMMARY OF THE INVENTION

An object of the present invention is to provide a sight scope, in which the size of an aiming point can be changed depending on a distance to a target.

According to the present invention, there is provided a sight scope comprising:

(a) a sleeve-like body;

(b) a translucent mirror disposed within the body;

(c) a light source disposed on the body at a location positionally offset from the translucent mirror toward an eyepiece side and adapted to emit light toward the translucent mirror, light reflected on the translucent mirror being proceeded toward the eyepiece side and served as an aiming point; and (d) a shield member disposed on the body, the shield member being located between the translucent mirror and the light source and movable on a plane generally perpendicular to an axis of the body, the shield member being provided with a plurality of through-holes which are spacedly arranged in a moving direction of the shield member, the through-holes having different areas with each other, the light emitted from the light source being passed through selected one of the plurality of through-holes of the shield member and proceeded toward the translucent mirror.

DETAILED DESCRIPTION OF THE INVENTION

Figure 1:
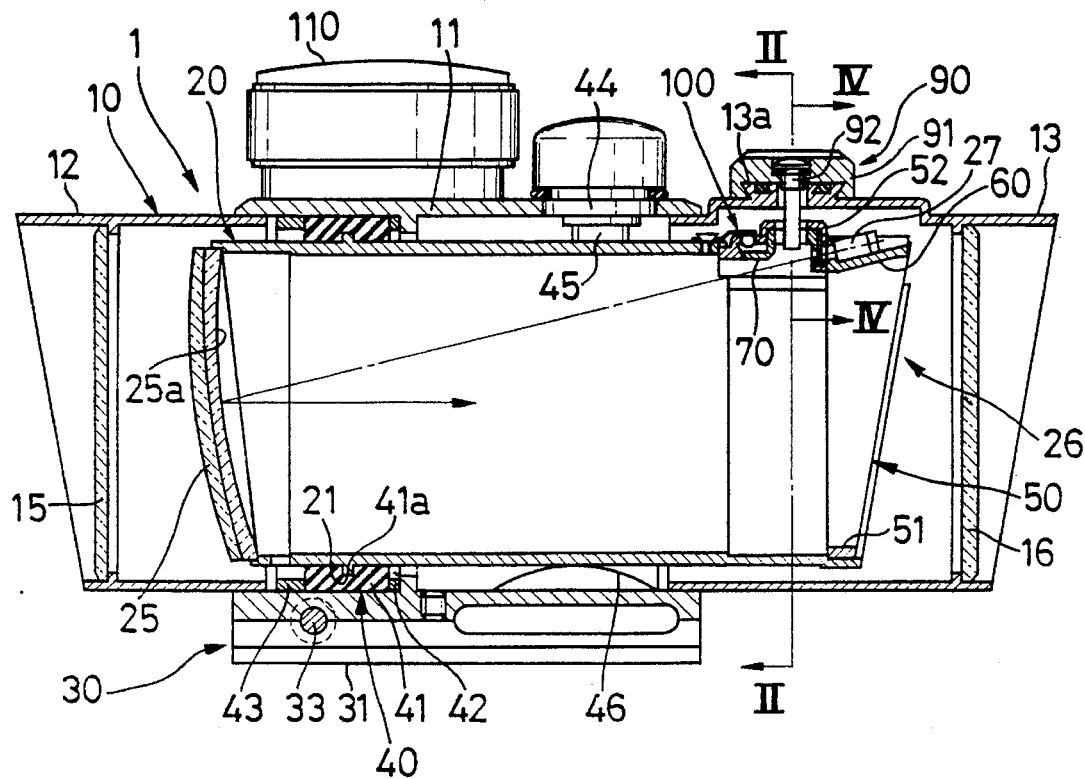
FIG. 1 is a vertical sectional view showing one embodiment of a sight scope according to the present invention.
Figure 2:
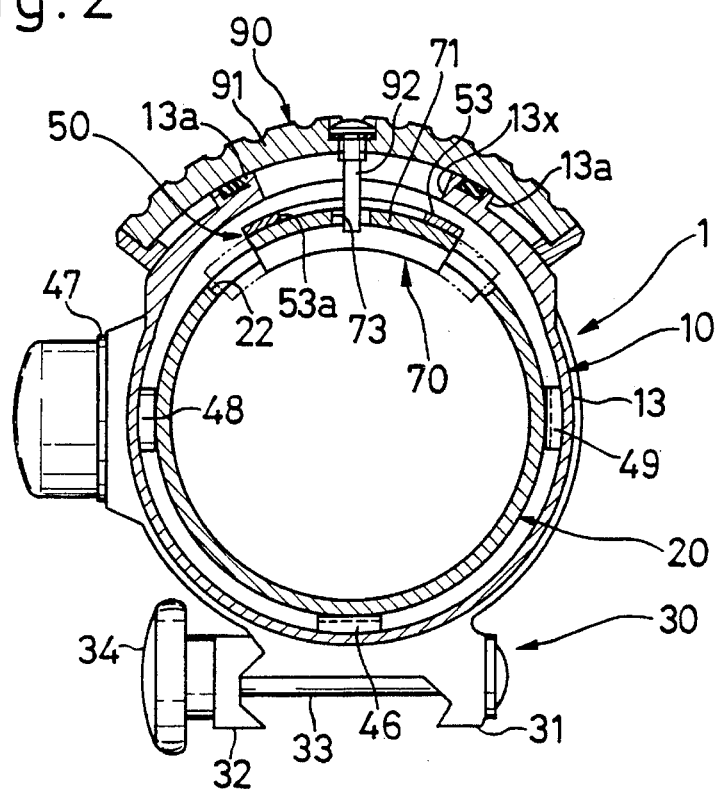
FIG. 2 is a cross-sectional view taken on line II—II of FIG. 1.

The present invention will be described hereinafter with reference to the accompanying drawings. As shown in FIGS. 1 and 2, a sight scope comprises a sleeve-like body 1. The body 1 includes an outer sleeve 10 and an inner sleeve 20 received in the outer sleeve 10.

The outer sleeve 10 comprises a central sleeve 11, an objective hood 12 which is threadedly engaged with a front end portion of the central sleeve 11, and an eyepiece hood 13 which is threadedly engaged with a rear end portion of the central sleeve 11. These objective and eyepiece hoods 12 and 13 are coaxially secured to the central sleeve 11. The objective hood 12 is provided with a cover glass 15 fixed thereto, while the eyepiece hood 13 is provided with another cover glass 16 likewise fixed thereto, thereby the inside of the outer sleeve 10 is kept in an air-tight condition.

A known scope mount mechanism 30 is provided on a lower side of the central sleeve 11. As clearly shown in FIG. 2, this mount mechanism 30 includes a projection 31 integral with the central sleeve 11, an engagement member 32 located opposite to the projection 31, a threaded rod 33 pierced through the projection 31 and the engagement member 32, and a nut 34 threadedly engaged with the rod 33. For mounting the sight scope on a rifle gun, the sight scope is placed on a base formed on the rifle gun in such a manner that the base is sandwiched between the projection 31 and the engagement member 32, and then the nut 34 is fastened tight.

The inner sleeve 20 can be inclined relative to the axis of the outer sleeve 10 by an adjustment mechanism 40 which is known per se. Specifically, as shown in FIG. 1, the adjustment mechanism 40 has an elastic support ring 41 which is received in an inner periphery of the central sleeve 11. The support ring 41 is sandwiched between and supported by rings 42 and 43 which are threadedly engaged with an inner periphery of the central sleeve 11. Fitted to this support ring 41 is that end portion of the inner sleeve 20 which is located on the objective side. The support ring 41 has an annular groove 41a formed in a central area of an inner periphery of the support ring 41. An annular rib portion 21 formed on an outer periphery of the inner sleeve 20 is fitted into the groove 41a. As a result, the inner sleeve 20 can be inclined relative to the axis of the outer sleeve 10 while being prohibited from moving in the axial direction by the support ring 41. On the other hand, the central sleeve 11 is provided on an upper end portion thereof with a screw holder 44 in which an adjustment screw 45 is screwed, with a distal end of the adjustment screw 45 contacting an outer peripheral surface of the inner sleeve 20. A plate spring 46, which is interposed between the inner sleeve 20 and the central sleeve 11, is disposed at a location (i.e., at a lower portion) radially opposite to the adjustment screw 45. Through coaction of the adjustment screw 45 and plate spring 46, the inner sleeve 20 is rotated about the support ring 41 and is capable of being vertically inclined relative to the axis of the outer sleeve 10. Similarly, as shown in FIG. 2, one side of the central sleeve 11 is provided with another screw holder 47 and another adjustment screw 48 to be screwed into the holder 47, while the other side is provided with another plate spring 49 radially opposite to the adjustment screw 48. By the adjustment screw 48 and plate spring 49, the inner sleeve 20 can be inclined in a horizontal direction relative to the axis of the outer sleeve 10.

A semi-transparent or translucent mirror 25 is secured to that end portion of the inner sleeve 20 which is located on the objective side. This translucent mirror 25 is inclined a predetermined angle relative to an axis of the inner sleeve 20. This inclination angle will be described later. A reflecting surface 25a of the translucent mirror 25 is concave.

A rear end portion (i.e., that end portion on the eyepiece side) of the inner sleeve 20 is provided with a light emitting diode or LED 27 (light source) and a shield plate 80 (which is not shown in FIG. 1 because the shield plate 80 is thin), which are held by a sleeve-like holder assembly 26.

Figure 6A:
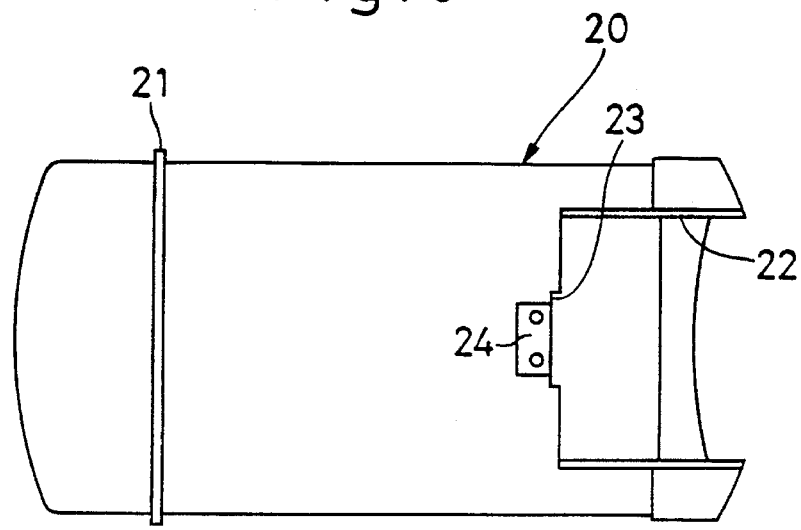
FIG. 6A is a plan view showing an inner sleeve of the above embodiment.
Figure 6B:
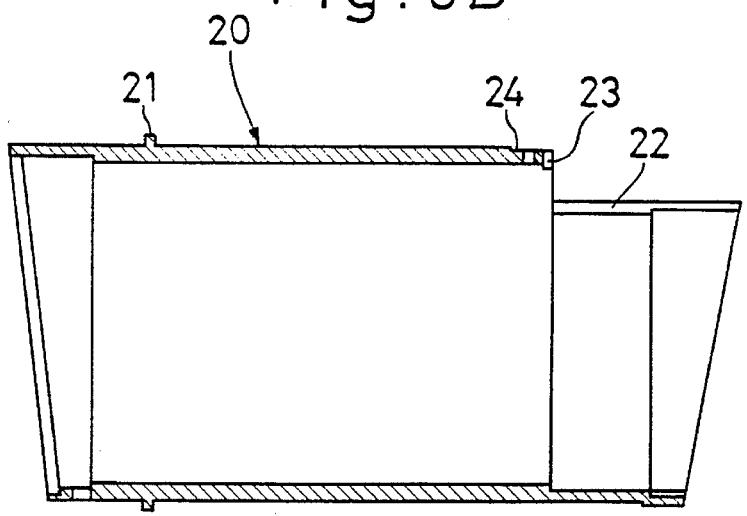
FIG. 6B is a vertical sectional view thereof.
Figure 6C:
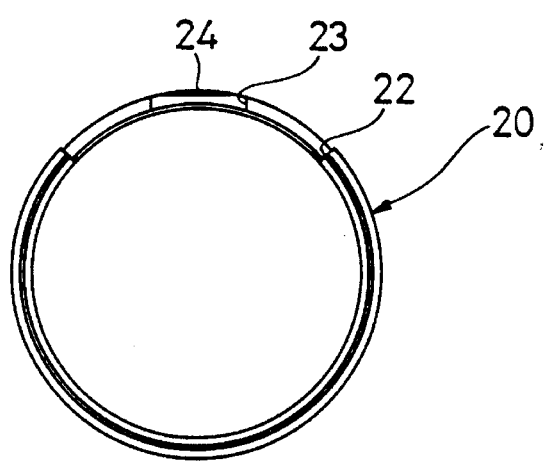
FIG. 6C is a right side view thereof.

Before proceeding to the holder assembly 26, the configuration of the eyepiece-side end portion of the inner sleeve 20 will be described in detail. As best shown in FIGS. 6A to 6C, a generally rectangular cut 22 is formed in an upper portion of the rear end portion of the inner sleeve 20. This cut 22 has a shallow recess 23 formed in a central area of a front edge of the cut 22. A flat mount surface 24 is formed on an upper surface of the inner sleeve 20 adjacent to the recess 23.

The holder assembly 26 includes a first holder 50, a second holder 60 and a third holder 70. The second holder 60 is designed such that it directly holds the LED 27, and the third holder 70 is designed such that it directly holds the shield plate 80. The first holder 50 is designed such that it holds the second and third holders 60 and 70 on the inner sleeve 20.

Figure 5:
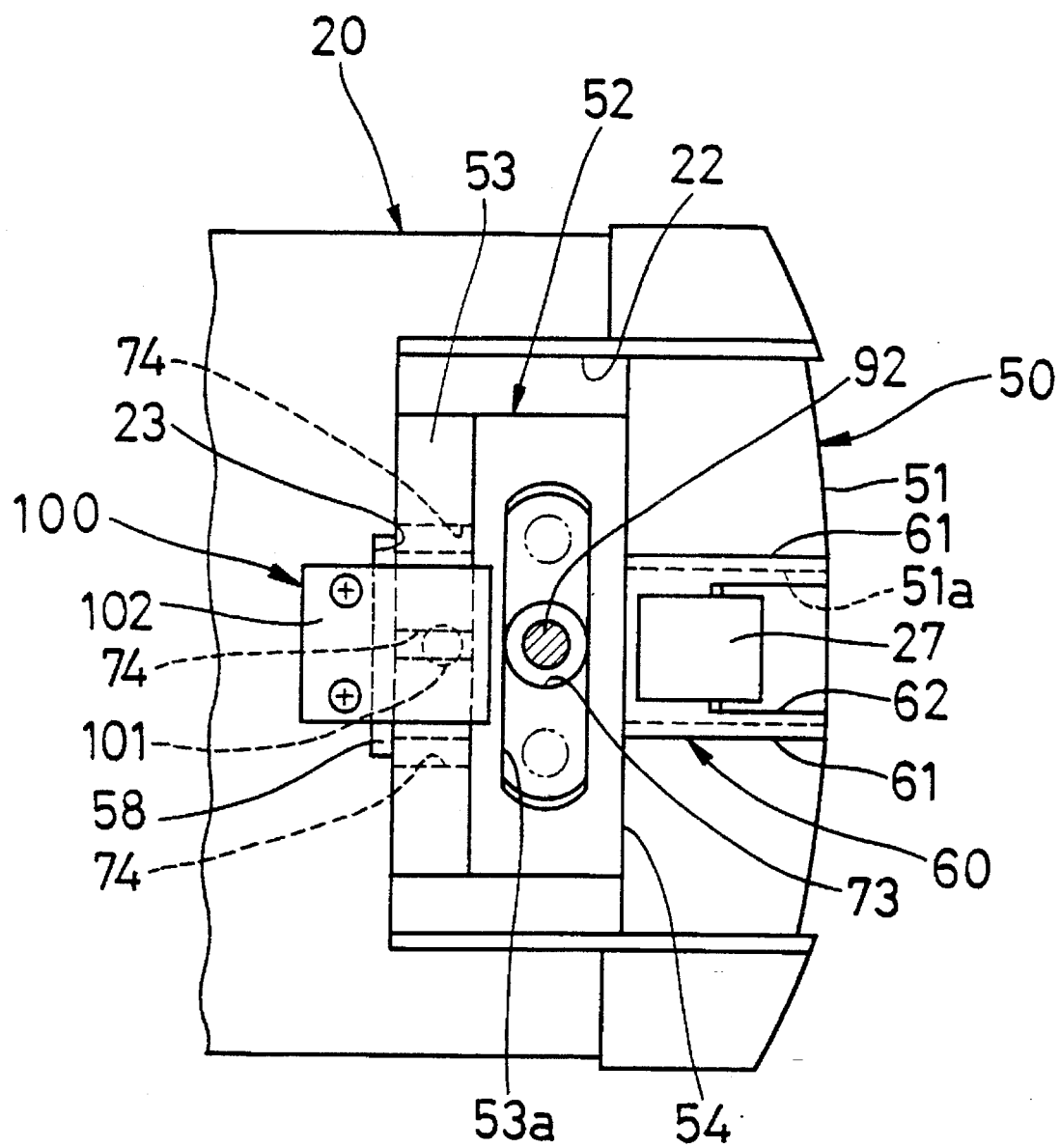
FIG. 5 is a plan view when viewed in a direction indicated by V of FIG. 3.
Figure 7A:
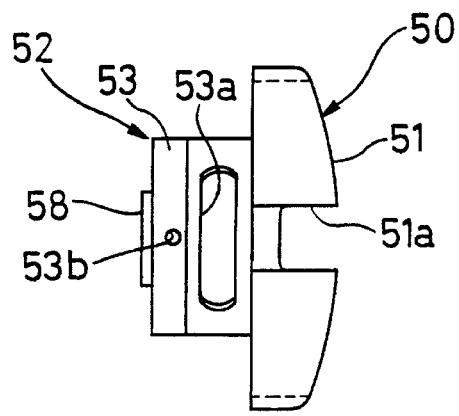
FIG. 7A is a plan view showing a first holder of the above embodiment.
Figure 7B:
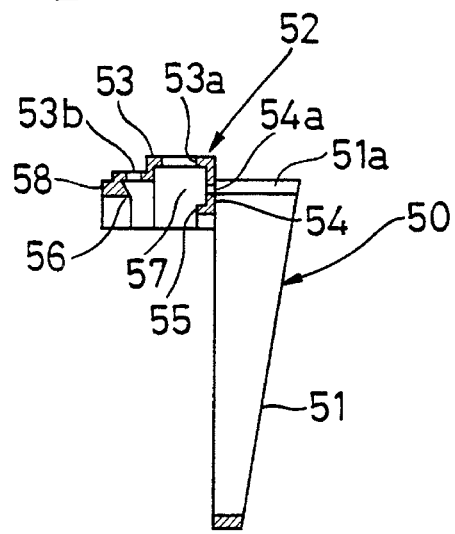
FIG. 7B is a vertical sectional view thereof.
Figure 7C:
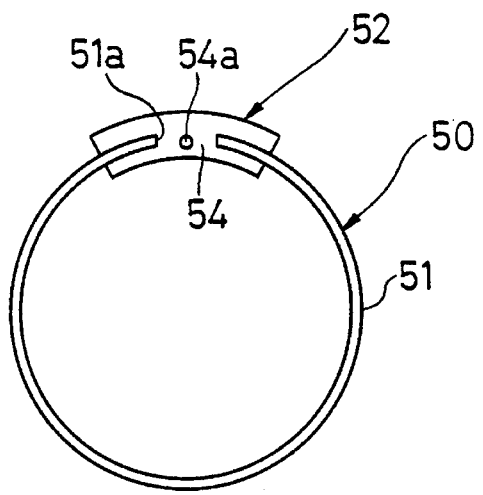
FIG. 7C is a right side view thereof.

As best shown in FIGS. 7A to 7C, the first holder 50 includes a short sleeve portion 51, and a guide portion 52 projecting from an upper portion of the short sleeve portion 51 toward the objective side. As shown in FIGS. 1 and 5, the first holder 50 is supported by the inner sleeve 20 with the short sleeve portion 51 fitted in an inner periphery of the eyepiece-side end portion of the inner sleeve 20 and the guide portion 52 received in the cut 22 of the inner sleeve 20. A cut 51a for mounting the second holder 60 is formed in the upper portion of the short sleeve portion 51.

The guide portion 52 is of an arcuate configuration as shown in FIG. 7C, and includes a stepped peripheral wall 53 and an end wall 54 extending radially inwardly of the inner sleeve 20 from a rear end of the peripheral wall 53. The short sleeve portion 51 is integral with this end wall 54. As shown in FIG. 7B, an arcuate projection 55 projecting forwardly is formed on a lower edge of the end wall 54. Another arcuate projection 56 projecting backwardly is formed on a lower surface of a front edge of the peripheral wall 53. A guide groove 57 for guiding the third holder 70 is defined by the peripheral wall 53, end wall 54, and projections 55 and 56. This guide groove 57 extends in a peripheral direction of the inner sleeve 20 and is of an arcuate configuration.

A projection 58 is formed on a front edge of the peripheral wall 53 of the first holder 50. This projection 58 is fitted into the recess 23 of the inner sleeve 20 to correctly position the first holder 50 relative to the inner sleeve 20, as shown in FIGS. 3 and 5.

In the peripheral wall 53 of the first holder 50, a slit 53a extending in a peripheral direction is formed in a rear portion having a large radius of curvature, and a receiving hole 53b is formed in a front portion having a small radius of curvature. The slit 53a allows a shaft 92 of an operation mechanism 90 as later described, to pierce therethrough. The receiving hole 53b is designed for receiving a steel ball 101 of a lock mechanism 100 as later described. A round through-hole 54a facing the cut 51a of the short sleeve portion 51 is formed in a central area of the end wall 54 of the first holder 50. This through-hole 54a allows the light from the LED 27 to pass therethrough.

Figure 3:
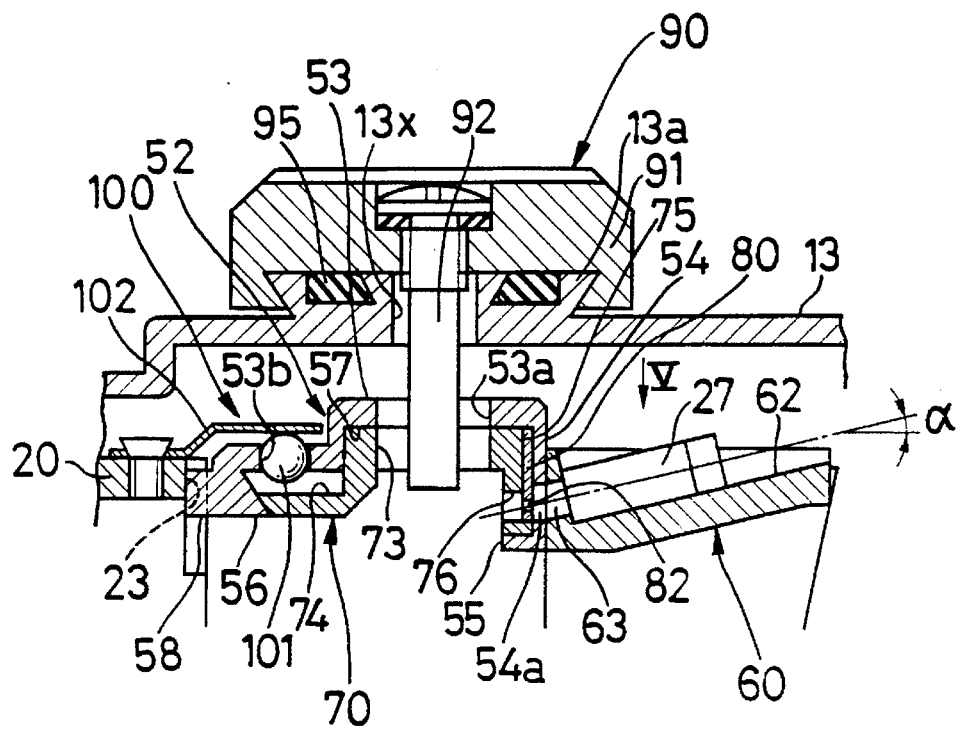
FIG. 3 is an enlarged sectional view of an important portion of FIG. 1.
Figure 4:
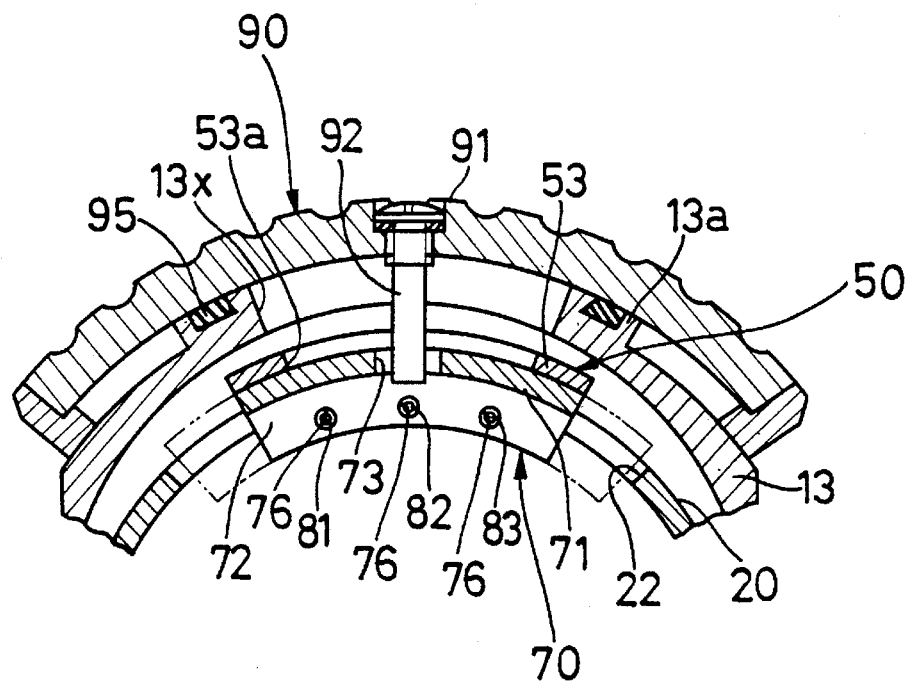
FIG. 4 is an enlarged sectional view taken on line IV—IV of FIG. 1.
Figure 8A:
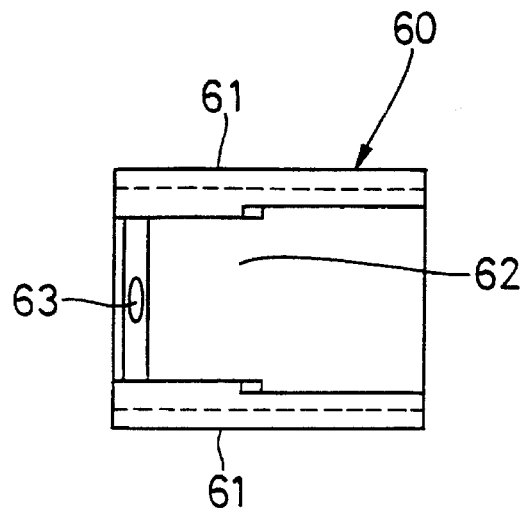
FIG. 8A is a plan view showing a second holder of the above embodiment.
Figure 8B:
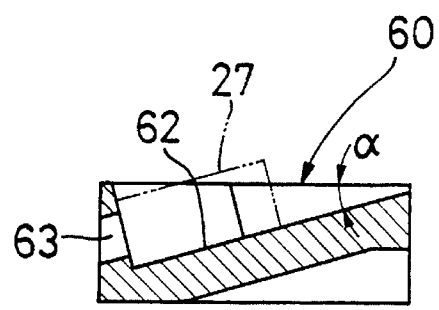
FIG. 8B is a vertical sectional view thereof.
Figure 8C:
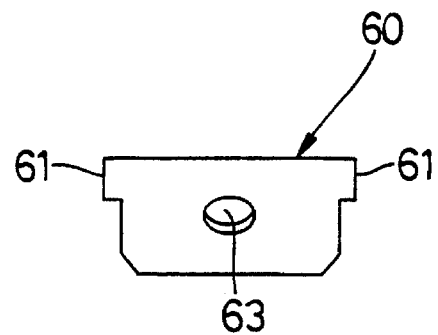
FIG. 8C is a left side view thereof.

As shown in FIGS. 1, 3 and 5, the second holder 60 for holding the LED 27 is supported by the short sleeve portion 51 of the first holder 50. As shown in FIGS. 8A to 8C, the second holder 60 is rectangular in plan view and has a pair of protrusions 61 formed on opposite side portions thereof and extending in parallel to the axis of the inner sleeve 20. As shown in FIG. 5, the second holder 60 is secured to the first holder 50, with opposite side portions thereof fitted in the cut 51a of the short sleeve portion 51 and lower surfaces of the protrusions 61 and 61 abutted with an outer peripheral surface of the short sleeve portion 51. As shown in FIGS. 3 and 5, a front edge of the second holder 60 is in contact with the end wall 54 of the first holder 50.

A recess 62 is formed in an upper surface of the second holder 60. A bottom surface of this recess 62 is inclined at an angle a relative to the axis of the inner sleeve 20. The LED 27 is received in the recess 62 in an inclined posture with a lower surface of the LED 27 in contact with the bottom surface of the recess 62. A round through-hole 63 is formed in a wall interrupting a front end side of the recess 62. An axis of this through-hole 63 is also inclined at the same angle as mentioned relative to the bottom surface of the recess 62. The light from the LED 27 is passed through the through-hole 63.

Figure 9A:
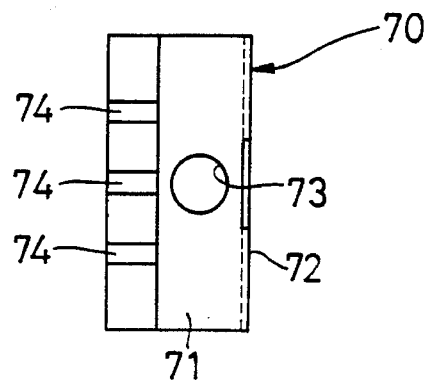
FIG. 9A is a plan view showing a third holder of the above embodiment.
Figure 9B:
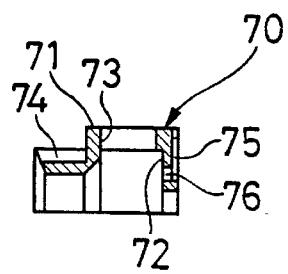
FIG. 9B is a vertical sectional view thereof.
Figure 9C:
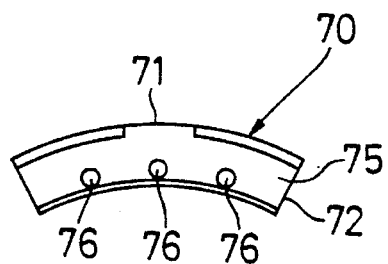
FIG. 9C is a right side view thereof.
Figure 9D:
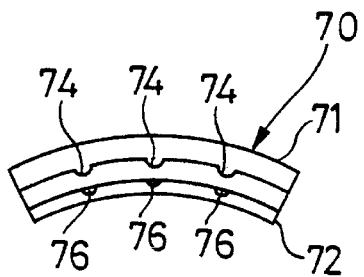
FIG. 9D is a left side view thereof.

As shown in FIG. 3, the third holder 70 for holding the shield plate 80 is received in the guide groove 57 of the first holder 50 so that the holder 70 can move in the peripheral direction of the inner sleeve 20 (i.e., along the guide groove 57). As shown in FIGS. 9A to 9D, the third holder 70 includes a stepped arcuate peripheral wall 71, and an end wall 72 extending radially inwardly of the inner sleeve 20 from a rear edge of the peripheral wall 71. As shown in FIGS. 9A and 9B, a receiving hole 73 for receiving the shaft 92 of the operation mechanism 90 as later described is formed in a central area of a rear portion, which has a large radius of curvature, in the peripheral wall 71. As shown in FIGS. 2 to 5, this receiving hole 73 is in opposite relation to the slit 53a of the first holder 50. In the peripheral wall 71, three engagement grooves 74 extending in the axial direction of the inner sleeve 20 are formed in a front outer peripheral surface having a small radius of curvature, with spaces in a longitudinal direction of the third holder 70 (i.e., peripheral direction of the inner sleeve 20). A shallow recess 75 is formed in a rear end face of the end wall 72. Three through-holes 76 are formed in that area of the end wall 72 where the recess 75 is formed. As apparent from FIG. 9(D), the three through-holes 76 are located behind the three engagement grooves 74 such that the through-holes 76 occupy the same positions as the respectively engagement grooves 74 in the peripheral direction.

Figure 10:
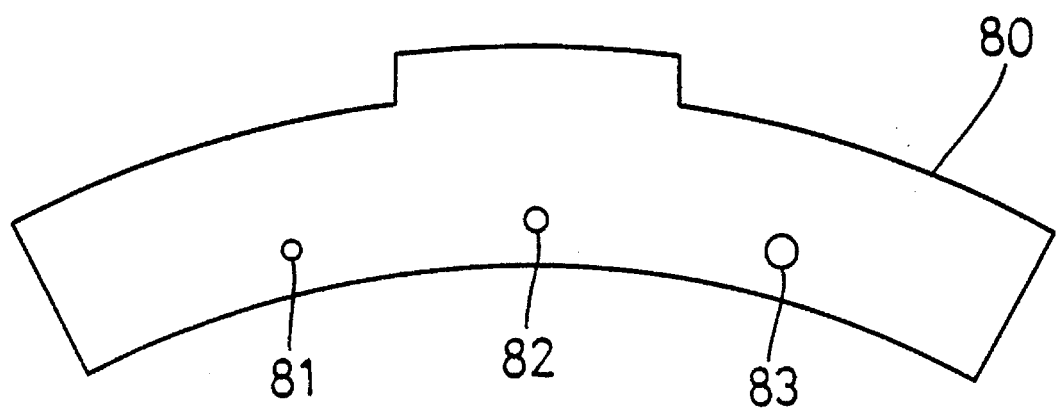
FIG. 10 is a front view showing a shield plate of the above embodiment.

As shown in FIG. 3, the shield plate 80 (shield member) is fixedly received in the recess 75 formed in the rear end face of the third holder 70. The shield plate 80 is formed of a metal plate of about 0.1 mm in thickness, such as nickel. FIG. 3 shows the thickness of the shield plate 80 in a somewhat exaggerated manner. As shown in FIG. 10, the shield plate 80 is of the same configuration as the recess 75 of the third holder 70. Three round through-holes 81, 82 and 83 are formed in the shield plate 80 with spaces in a longitudinal direction of the shield plate 80 (i.e., in the peripheral direction of the inner sleeve 20). The through-holes 81, 82 and 83 are smaller than the through-hole 54a of the first holder 50, the through-hole 63 of the second holder 60 and the three through-holes 76 of the third holder 70, respectively, and they are positionally coincident (see FIG. 4) with the through-holes 76 of the third holder 70. The through-holes 81, 82 and 83 are different in diameter with each other. The diameters of the through-holes 81, 82 and 83 are determined depending on the distance to a target and the size of the target. The diameters of the through-holes 81, 82 and 83 are 0.16 mm, 0.24 mm and 0.32 mm, respectively, in this embodiment. By moving the third holder 70 in the peripheral direction of the inner sleeve 20 along the guide groove 57 of the first holder 50, one of the through-holes 81, 82 and 83 can be selectively brought to be coincident with the through-hole 54a of the first holder 50 and the through-hole 63 of the second holder 60.

The third holder 70 and the shield plate 80 are moved by the operation mechanism 90 of FIGS. 1 to 4. The operation mechanism 90 comprises an arcuate operating member 91 extending in the peripheral direction along an upper outer peripheral surface of the eyepiece hood 13, and a shaft 92 (connecting member) extending radially inwardly from the center of the operating member 91. Specifically, a ridge 13a extending in a peripheral direction of the eyepiece hood 13 is formed on an outer peripheral surface of the eyepiece hood 13. The operating member 91 is movably mounted on the ridge 13a for movement in the peripheral direction. A slit 13x extending in the peripheral direction is formed in the ridge 13a. The shaft 92 pierces through and extends downwardly of the slit 13x, with an upper end portion thereof threadedly engaged with the operating member 91 and a lower end portion thereof received in the receiving hole 73 of the third holder 70 through the slit 53a of the first holder 50. Accordingly, when the operating member 91 is moved in the peripheral direction, the third holder 70 and shield plate 80 are moved in the same direction following the movement of the operating member 91, so that one of the through-holes 81 to 83, which is to be coincident with the through-holes 54a and 63, can be selected.

For enabling the inclination of the inner sleeve 20, the diameter of the shaft 92 is dimensioned smaller than the width of the slits 13x and 53a and the diameter of the receiving hole 73, so that room for play is available. A seal member 95 is interposed between the operating member 91 and the ridge 13a in order to ensure air-tightness.

The third holder 70 is selectively positioned in one of the three locking positions by the lock mechanism 100 of FIGS. 3 and 5. Specifically, the steel ball 101 is received in the receiving hole 53b of the first holder 50. The steel ball 101 is biased by a plate spring 102 secured to the mount surface 24 of the rear end portion of the inner sleeve 20 and fitted in one of the three engagement grooves 72, thereby correctly positioning the third holder 70. With the steel ball 101 engaged in the engagement groove 74 of the third holder 70, if the operating member 91 is moved in the peripheral direction of the eyepiece hood 13, the third holder 70 is forcibly moved in the peripheral direction. At that time, the steel ball 101 held by the third holder 70 is escaped from the engagement groove 74 against the biasing force of the plate spring 102 and proceeded toward another engagement groove 74.

In each of the three locking positions of the third holder 70, one of the three through-holes 81 to 83 of the shield plate 80 mounted on the third holder 70 is coincident with the through-hole 54a of the first holder 50 and the through-hole 63 of the second holder 60. In that condition, as shown in FIGS. 1 and 3, the through-holes 54a and 63, one of the through-holes 76, and one of the through-holes 81 to 83 are arranged on a line connecting the LED 27 and the center of the translucent mirror 25.

The line connecting the LED 27, the selected one of the through-holes 81 to 83 and the translucent mirror 25 is inclined relative to the axis of the inner sleeve 20. This inclination angle is indicated by a in FIG. 3. An inclination angle of the translucent mirror 25 is set to α/2 in view of the foregoing inclination α. Owing to this arrangement, the light emitted from the LED 27 and reflected by the translucent mirror 25 is proceeded on the axis of the inner sleeve 20 toward the eyepiece side and served as the aiming point for a gun shooter.

As shown in FIG. 1, the central sleeve 11 is provided with a case 110 of receiving a battery (not shown) for the LED 27.

For using the sight scope thus constructed, the gun shooter manipulates the adjustment mechanism 40 to incline the inner sleeve 20 relative to the outer sleeve 10 taking into consideration of the distance to the target and the strength of the wind. By doing this, the gun shooter adjusts a relative position between the target and the aiming point. Then, the gun shooter operates the operating member 91 to move the third holder 70 in accordance with the distance to the target and the size of the target, so that one of the through-holes 81, 82 and 83 is brought to be coincident with the through-holes 54a, 63 and 76. By doing this, the size of a cross sectional area of the light emitted from the LED 27 toward the translucent mirror 25 is determined and thus, the size of the aiming point to be recognized by the gun shooter is determined. For example, in the case where the distance to the target is long (or the target is small), the light from the LED 27 is passed through the through-hole 81 of a small area. In contrast, in the case where the distance to the target is short (or the target is large), the light from the LED 27 is passed through the through-hole 83 of a large area. In this way, since the ratio between the size of the target and the size of the aiming point which are recognized by the gun shooter can be properly set, it becomes easier for the gun shooter to aim at the target.

The present invention is not limited to the above embodiment, and many changes can be made without departing from the spirit of the invention. For example, it is possible that a mark is printed on a central area of the operating member 91 and three distance indications are appeared on the outer peripheral surface of the eyepiece hood 13. Owing to this change, it will become easier to select one of the through-holes 81 to 83 by seeing the mark and distance indications.

Another change is possible in that the inner sleeve 20 is inclined only in the vertical direction relative to the outer sleeve 10. Owing to this change, play in the peripheral direction can be eliminated between the shaft 92 of the operation mechanism 90 and the receiving hole 73 of the third holder 70 in order to enhance the operability for selecting one of the through-holes 81 to 83 of the shield plate 80.

The through-holes of the shield plate may take any suitable shapes such as triangle and cross. The shapes of the through-holes may all be different from each other. Owing to this modification, it can be recognized with a single glance whether or not the selected through-hole corresponds to the distance to the target. The number of the through-holes is not limited to three but may be two, or four or more.

The body of the sight scope may be comprised of a single sleeve. In this case, a translucent mirror, a light source and a shield plate are provided on this single sleeve. The reflecting surface of the translucent may be flat.

The present invention can also be applied to a sight scope for an archery.

What is claimed is:

1. A sight scope comprising:
   (a) an outer sleeve having a slit which extends in a peripheral direction of said outer sleeve;
   (b) an inner sleeve received in said outer sleeve;
   (c) an adjustment mechanism for inclining said inner sleeve relative to an axis of said outer sleeve;
   (d) a translucent mirror provided on a first end portion of said inner sleeve which is located on an objective side;
   (e) a light source provided on a second end portion of said inner sleeve which is located on an eyepiece side and adapted to emit light toward said translucent mirror, light reflected from said translucent mirror being projected toward the eyepiece side and serving as an aiming point;
   (f) a shield member provided on said second end portion of said inner sleeve, said shield member being located between said translucent mirror and said light source, said shield member having an arcuate shape which extends in a peripheral direction of said inner sleeve and being movable in the peripheral direction of said inner sleeve, said shield member being provided with a plurality of through-holes which are spacedly arranged in a moving direction of said shield member, said through-holes having different areas with respect to each other, the light emitted from said light source being passed through a selected one of said plurality of through-holes of said shield member and projected toward said translucent mirror;
   (g) an operating member disposed on an outer periphery of said outer sleeve for movement in the peripheral direction of said outer sleeve, said operating member having an arcuate portion extending in the peripheral direction of said outer sleeve, said arcuate portion covering said slit of said outer sleeve; and
   (h) connecting means for connecting said operating member to said shield member, said connecting means including a shaft which extends radially of said outer sleeved and is pierced through said slit in said outer sleeve.

2. A sight scope according to claim 1, further comprising a lock mechanism for locking said shield member at a plurality of locking positions relative to said inner sleeve, each of said plurality of through-holes being arranged on a line connecting said light source and said translucent mirror at said plurality of locking positions for said shield member.

3. A sight scope according to claim 1, further comprising a holder for holding said shield member of a flat sheet-like shape and support means for supporting said holder movably in the peripheral direction of said inner sleeve, said support means being provided on said second end portion of said inner sleeve, said light source being mounted on said support means, said shaft having its one end connected to said operating member and its other end received in a receiving hole which is formed in said holder.

* * * * *

UNITED STATES PATENT AND TRADEMARK OFFICE
CERTIFICATE OF CORRECTION

PATENT NO. : 5,508,843
DATED : April 16, 1996
INVENTOR(S) : Saburo TOMITA

It is certified that error appears in the above-indentified patent and that said Letters Patent is hereby corrected as shown below:

Column 8, line 21, change "sleeved" to --sleeve--.

Signed and Sealed this

Twentieth Day of August, 1996

BRUCE LEHMAN

Attest:

*Attesting Officer*    *Commissioner of Patents and Trademarks*